United States Patent

Park et al.

[11] Patent Number: 5,907,445
[45] Date of Patent: May 25, 1999

[54] APPARATUS AND METHOD FOR CONTROLLING HARD DISK DRIVE-LOCATING POSITION BY COUNTING SECTORS

[75] Inventors: Chan-geu Park, Seoul; Yong-woo Park; Jeung-il Park, both of Suwon, all of Rep. of Korea

[73] Assignee: Samsung Electronics Co., Ltd., Kyungki-do, Rep. of Korea

[21] Appl. No.: 08/901,786

[22] Filed: Jul. 28, 1997

[30] Foreign Application Priority Data

Jul. 27, 1996 [KR] Rep. of Korea .................. 96-30890

[51] Int. Cl.[6] .................................................. G11B 27/30
[52] U.S. Cl. .................................. 360/72.1; 711/112
[58] Field of Search ........................ 360/71, 72.1, 72.2; 711/112

[56] References Cited

U.S. PATENT DOCUMENTS 5,559,647  9/1996  Kusano ........................ 360/72.1 X Primary Examiner—David L. Robertson
Attorney, Agent, or Firm—Sughrue, Mion, Zinn, Macpeak & Seas, PLLC

[57] ABSTRACT

An error-tolerant apparatus and method are disclosed for controlling disk read/write actions on a hard disk drive having no identification (ID) information in the data sectors. A servo sector number is calculated each time a servo sector pulse is input. When a target servo sector number is the same as the calculated servo sector number, a determination is made whether a data read/write error exists. If there is no error, a servo sector is detected and the calculated servo sector number is updated. If there is an error, the calculated servo sector number is maintained. Afterwards, a data read/write error is detected when the target servo sector is detected, the data sector number in the maintained servo sector is set to a number of data sector units to be skipped, and the disk read/write operation is performed from the data sector next to the previous sector.

8 Claims, 6 Drawing Sheets

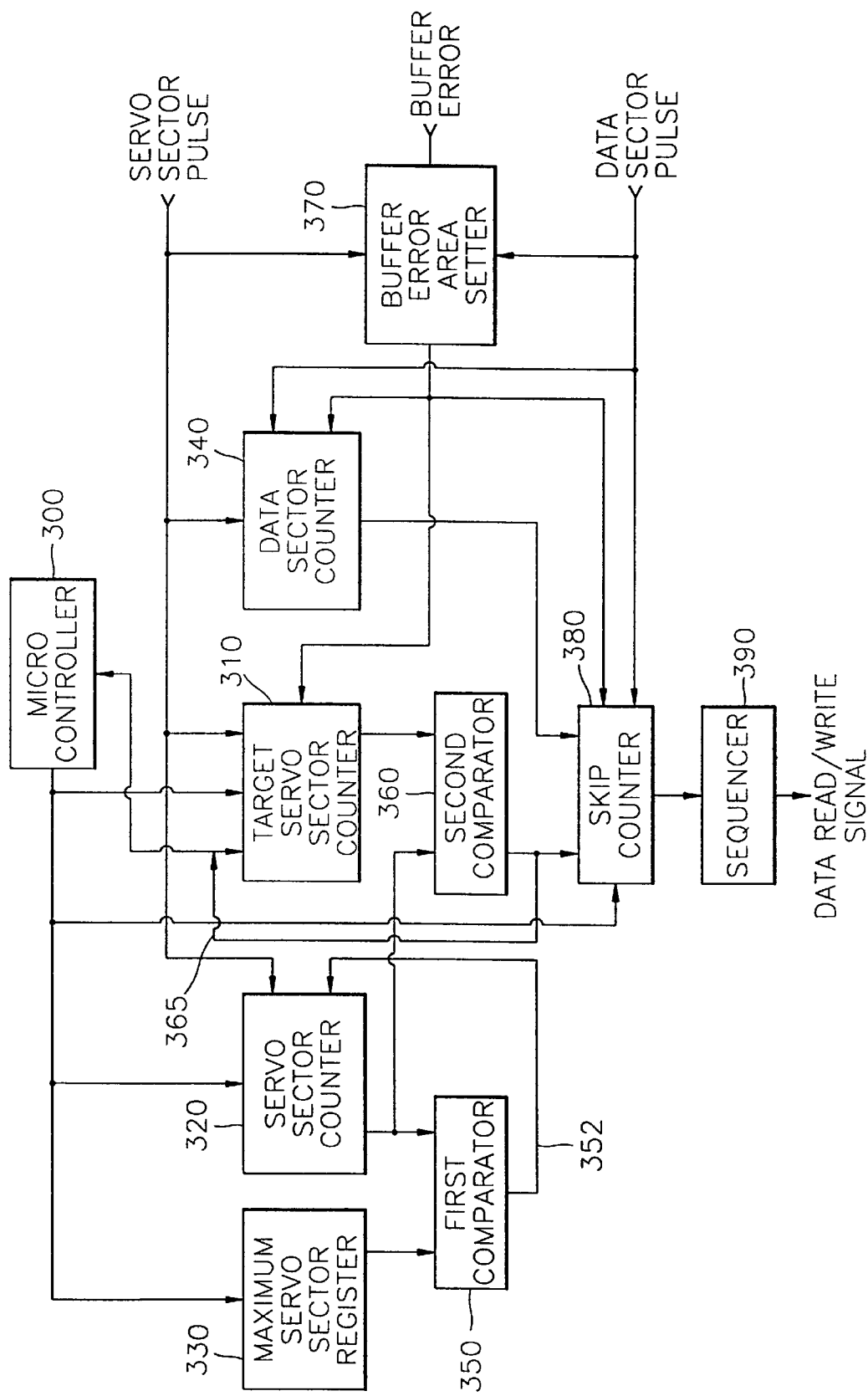

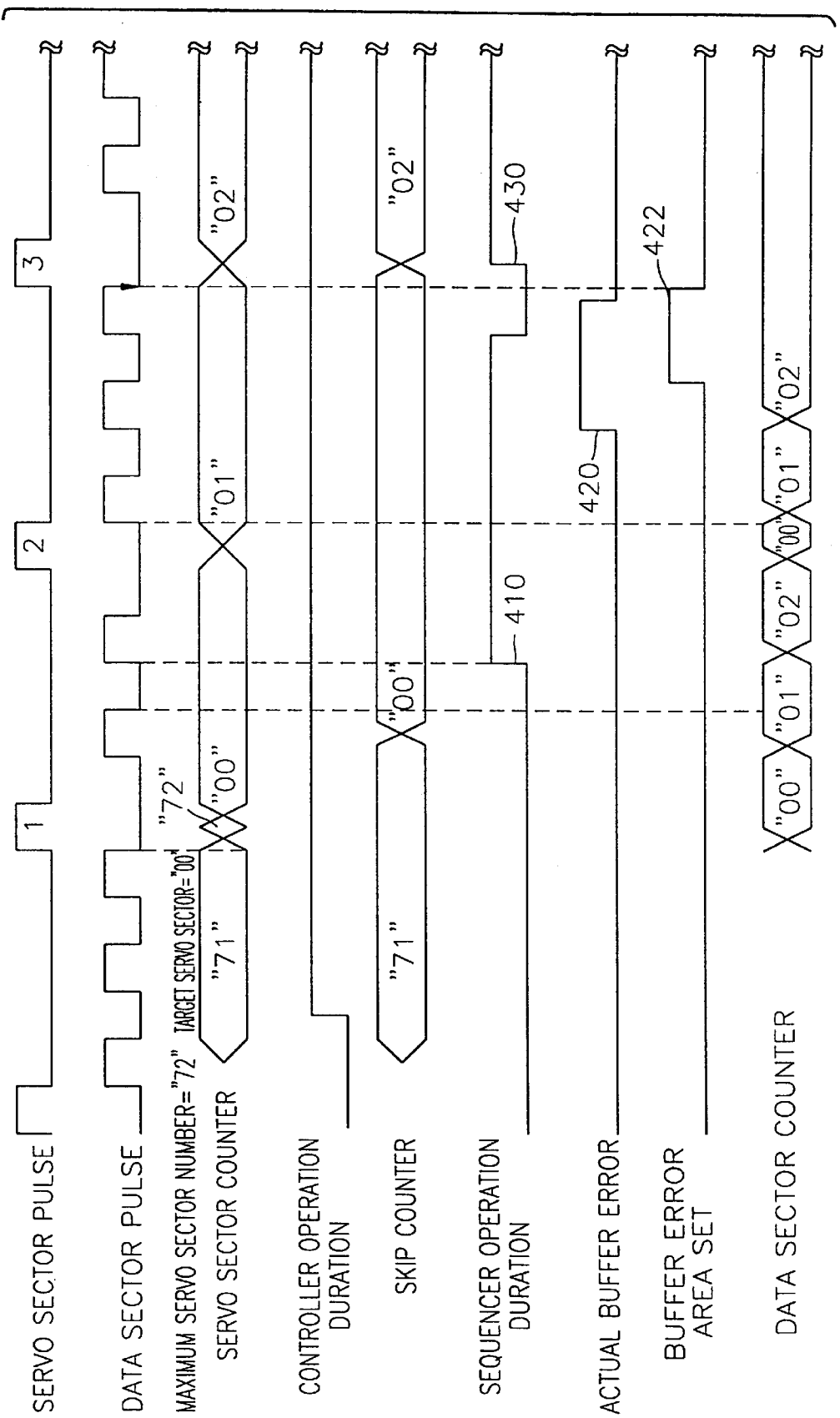

APPARATUS AND METHOD FOR CONTROLLING HARD DISK DRIVE-LOCATING POSITION BY COUNTING SECTORS

BACKGROUND OF THE INVENTION

1. Field of the Invention

The present invention relates to a hard disk drive, and more particularly, to an apparatus and method for controlling read/write operations of data on a hard disk having no identification (ID) information. This application for an apparatus and method for controlling a hard disk drive is based on Korean Patent Application No. 96-30890 which is incorporated herein by reference for all purposes.

2. Description of the Related Arts

FIG. 1 is a block diagram of a typical hard disk drive. As shown in FIG. 1, a hard disk drive includes a plurality of disks 110 and heads 112, each of which flies over a surface of a corresponding disk. The heads 112 picks up a signal and the signal is amplified by a preamplifier 114 which is electrically connected to the heads 112. The amplified signal is then supplied to a read/write circuit 116. The read/write circuit 116 detects and decodes a data pulse from the signal output by the preamplifier 114 and supplies the decoded data pulse to a disk controller 118. Additionally, the read/write circuit 116 encodes data output by the disk controller 118 and supplies the encoded data to the preamplifier 114.

The disk controller 118 includes a sequencer which performs actions according to a program downloaded from a microcontroller 122. The disk controller 118 writes data received from a host computer onto the disk 110 via the read/write circuit 116 and the preamplifier 114, and transmits the data read out from the disk 110 to the host computer.

The disk controller 118 also interfaces communication between the host computer and the microcontroller 122. A buffer RAM 120 buffers data transmitted between the host computer, the microcontroller 122 and the read/write circuit 116.

The microcontroller 122 controls the disk controller 118 and track search and tracking operations in response to a read/write command received from the host computer. A ROM 124 stores programs, which are executed by the microcontroller 122, as well as various parameters.

A servo driver 126 generates a driving current for driving an actuator 128 according to head control data output by the microcontroller 122. The actuator 128 moves the head 122 across the disk according to the direction and magnitude of the driving current. A spindle motor driver 130 drives a spindle motor 132 in response to motor control data output by the microcontroller 122 such that the spindle motor 132 rotates according to the value of the control data.

A disk signal controller 134 decodes servo information from the read data output by the read/write circuit 116 to supply the decoded information to the microcontroller 122, and supplies various control signals necessary for the read/write operation to the disk controller 118.

FIG. 2A shows the data format of a hard disk drive. FIG. 2B is a timing diagram of a servo pulse train generated by the disk controller by detecting positions of servo areas shown in FIG. 2A. FIG. 2C is a timing diagram of data sector pulses generated by the disk controller 118 by detecting positions of the data sectors shown in FIG. 2A.

A hard disk is divided into a plurality of concentric cylinders (CYL). One of the cylinders is formatted as shown in FIG. 2A. In FIG. 2A, a cylinder consists of N servo sectors, each of which consists of a servo area and M data sectors. A single data sector consists of an identification (ID) area and a data area.

In a typical hard disk drive, ID information and data are recorded with uniform recording density to increase memory capacity, and each data area stores the same amount of data, i.e., 512 bytes, regardless of its position on the disk. Accordingly, if an embedded sector type of servo is employed, a single data sector may be split into two segments depending on the position of the data sector on a disk, which is referred to as a split data sector.

On the other hand, since each data sector includes an ID area containing ID information, in addition to a data area containing data, an area of each data sector as large as the ID area, e.g. 29 bytes, cannot be used by a user as data storage space.

Thus, the storage capacity may be increased if the ID information, which is an overhead that does not substantially store information, is deleted. Furthermore, the overhead for write-read recovery time between the ID area and the data area, approximately 8 $\mu$sec (which is a characteristic of the head), can be removed if the ID information is deleted. As a result of eliminating ID information, the disk capacity may increase by about 6%.

When there is no ID area on the disk, however, an additional method for searching for a target data sector is used. To search for the target data, the microcontroller 122 controls the disk controller 118 such that the disk controller 118 determines the current position of the head on the disk by counting the number of servo sectors from an index on the disk or reading the servo number written in a servo area, and controls the disk controller 118 to search for the target servo sector. Subsequently, the microcontroller 122 skips as many data sectors as the preset value in a skip counter, and then controls the disk controller 118 to initiate a disk read/write operation.

The buffer RAM 120 in the hard disk drive in FIG. 1 compensates for the difference in speed between the host computer and the hard disk drive. However, when the buffer RAM 120 becomes full or empty due to the difference between the operating speed of the host computer and that of the hard disk drive, an error occurs in that data cannot normally be read or written from or to the buffer.

When a buffer error occurs in a hard disk drive having ID information on the disks, the disk controller 118 searches for a target data sector using the ID information and automatically performs disk read/write operation from the point where the error occurred. The disk controller 118 does this by comparing the ID information written on the disk with information on the target data sector which is continuously updated after the target data sector is found.

In contrast, in a hard disk drive having no ID information on a disk, when the buffer error occurs, the target servo sector is not updated after the target data sector is found since there is no ID information. Also, the skip counter is not updated since there is no data sector to skip.

Thus, when a buffer error occurs during the disk read/write operations in a hard disk drive without ID information, the microcontroller 122 stops the operation of the sequencer, recognizes the operations performed before the buffer error occurred, and continuously detects the end of the buffer error. Then, the microcontroller 122 starts again the operation adjacent the one which had been performed just before the error occurred. This is disadvantageous because it is time-consuming and there may be numerous loads on the microcontroller 122.

SUMMARY OF THE INVENTION

To overcome the above problems, one object of the present invention is to provide a device for determining the ending of a buffer error occurring in a hard disk drive having no ID information, and for automatically performing the disk read/write actions after the disk actions which were performed before the occurrence of the buffer error.

Another object of the present invention is to provide a method by which the ending of a buffer error occurring in a hard disk drive having no ID information is determined, and by which the disk read/write actions, after the disk actions which were performed before the occurrence of the buffer error, are automatically performed.

In order to achieve one of the above objects, there is provided an apparatus for controlling a hard disk drive which performs disk read/write actions after searching for a target data sector. The apparatus includes a first counter which counts servo sectors and outputs a target servo sector number. It also includes a second counter for counting servo sectors and outputting a current servo sector number. A third counter in the apparatus counts data sectors and outputs a number of data sectors to be skipped when the target servo sector number from the first counter is equal to the current servo sector number from the second counter. The apparatus has a fourth counter for counting data sectors within a servo sector and outputting a data sector number, maintaining the data sector number when a data read/write error occurs, and outputting, to the third counter, a number of data sectors to be skipped when the error is terminated. The apparatus also includes a sequencer for controlling disk read/write actions when the number of data sectors to be skipped has been counted by the third counter.

In order to achieve the other of the objects above, there is provided a method for controlling a hard disk drive which performs disk read/write actions after searching a target data sector. The method comprises the steps of:

(a) calculating a current servo sector number whenever a servo sector pulse is input;

(b) determining whether a data read/write error exists when a target servo sector number is the same as the current servo sector number calculated in step (a);

(c) detecting a servo sector and updating the target servo sector number when there is no error in step (b), and maintaining the target servo sector number when there is an error in the step (b); and (d) detecting a data read/write error when the target servo sector is detected in step (c), setting the data sector number in the servo sector maintained in the step (c) as the number of data sector units to be skipped, and performing disk read/write actions from the data sector next to the one performed at previously.

BRIEF DESCRIPTION OF THE DRAWINGS

The above objects and advantages of the present invention will become more apparent by describing in detail a preferred embodiment thereof with reference to the attached drawings in which:

FIG. 3 is a block diagram illustrating a device according to the present invention which performs disk read/write actions and is in a microcontroller and a disk controller in a hard disk drive;

FIG. 4 is a timing diagram showing the operation of components shown in FIG. 3;

DETAILED DESCRIPTION OF THE PREFERRED EMBODIMENTS

Figure 1:
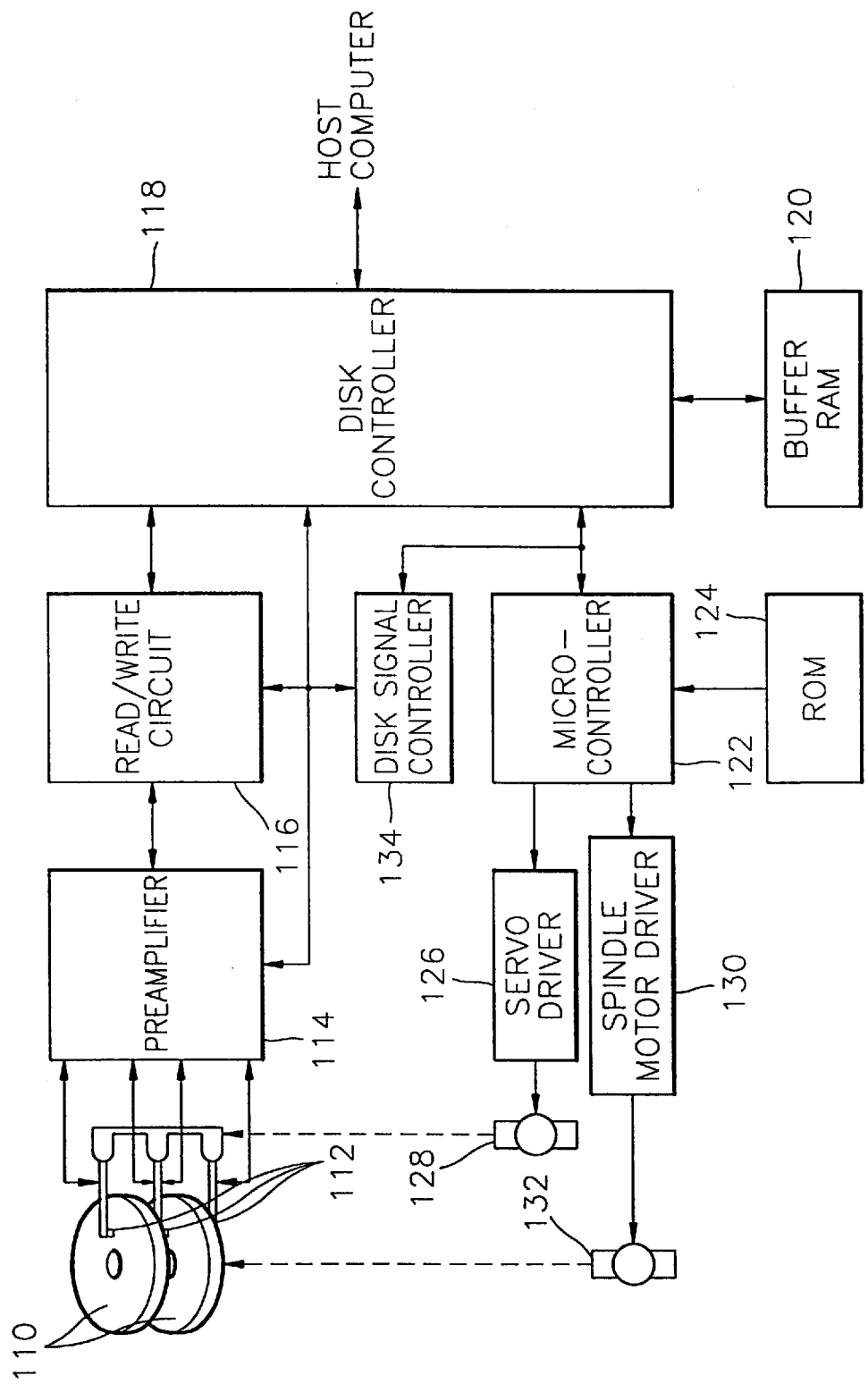
FIG. 1 is a block diagram of a conventional hard disk drive.
Figure 2A:
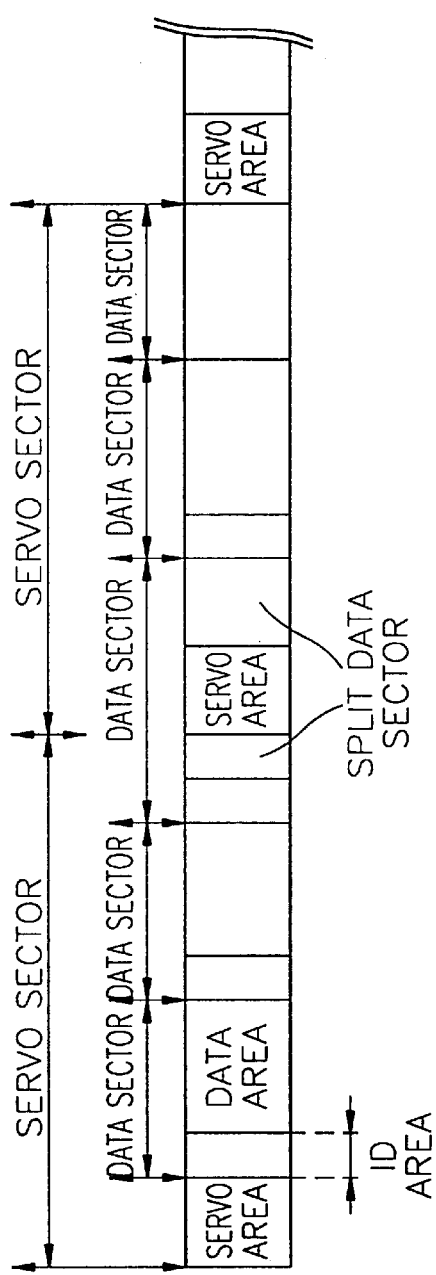
FIG. 2A illustrates the data format in a hard disk drive.
Figure 2B:
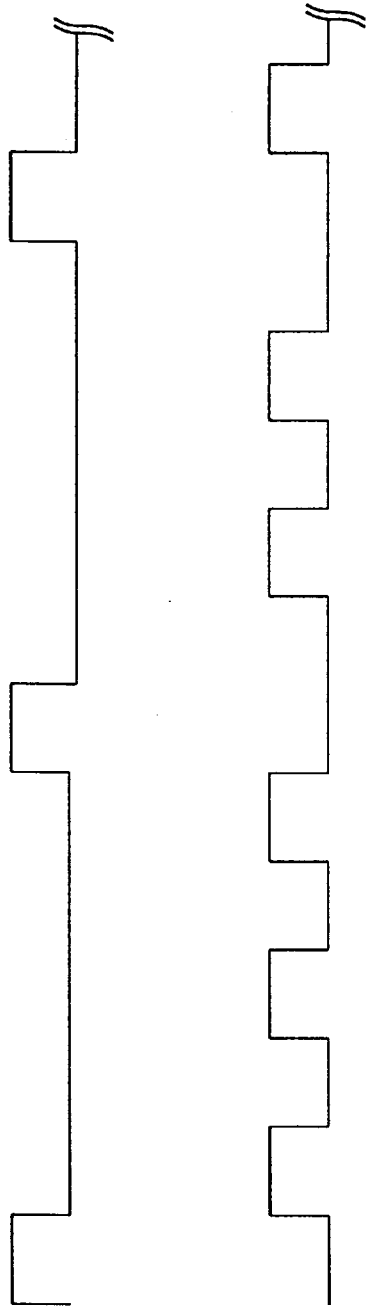
FIG. 2B is a timing diagram of servo pulses generated by a disk controller by detecting the position of servo areas shown in FIG. 2A.
Figure 2C:
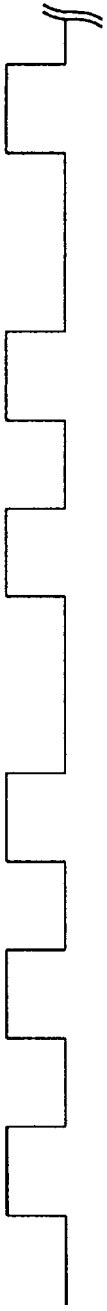
FIG. 2C is a timing diagram of data sector pulses generated by the disk controller by detecting the position of data sectors shown in FIG. 2A.

Referring to FIG. 3, an apparatus for controlling a hard disk drive includes a target servo sector counter 310, a servo sector counter 320, a maximum servo sector register 330, a data sector counter 340, first and second comparators 350 and 360, a buffer error area setter 370, a skip counter 380, and a sequencer 390.

A microcontroller 300 which controls the overall operation of a hard disk drive is incorporated in the apparatus of FIG. 3. The microcontroller 300 provides control signals to the maximum servo register 330, the servo sector counter 320, the target servo sector counter 310, and the skip counter 380.

The target servo sector counter 310 holds a target servo sector value. The servo sector counter 320 counts a servo sector pulse and holds the result as the current servo sector value. The maximum servo register 330 sets the maximum number of servo sectors in a disk cylinder. The data sector counter 340 counts the number of data sectors within a servo sector. The first comparator 350 compares the value of the servo sector counter 320 with the value of the maximum servo register 330. The second comparator 360 compares the value of the servo sector counter 320 with the value of the target servo sector counter 310. The buffer error area setter 370 sets a buffer error area for the target servo sector counter 310, with an input of a buffer error, a servo sector pulse and a data sector pulse. The skip counter 380 counts a number of data sectors to be skipped according to the output of the second comparator and the data sector pulse. The sequencer 390 outputs a disk read/write control signal according to the value of the skip counter 380.

The microcontroller 300 sets the number of a desired target sector and outputs the number to the target servo sector counter 310. Also, the microcontroller 300 sets the maximum number of servo sectors in the current cylinder, and outputs such number to the maximum servo register 330 so that the maximum servo register 330 stores the number. Additionally, the microcontroller 300 sets the current servo sector number to output the number to the servo sector counter 320, and the number of data sector units to be skipped for the skip counter 380.

The value of the servo sector counter 320 is increased by "1" whenever the servo sector pulse is input. The first comparator 350 compares the values of the servo sector counter 320 and the maximum servo register 330, and outputs a reset signal 352 to the servo sector counter 320 to reset the current sector number to "0" when the two values are determined to be the same.

The value of the servo sector counter 320 and the value of the target servo sector counter 310 are compared by the second comparator 360. When the two values are determined to be the same, the second comparator 360 outputs a signal of a predetermined level which indicates that the target servo sector has been reached. Then, the skip counter 380 starts to count the data sector pulses to be skipped after the target servo sector is reached. While the count value is not "0", the skip counter 380 counts down toward "0" whenever the data sector pulse is input. When the count value is "0", the sequencer 390 performs disk read/write actions at the current data sector.

When no buffer error occurs after the actions start, the sequencer 390 terminates the operation after applying the read/write control signal to the read/write circuit 116 (see FIG. 1) in order to perform the disk actions whenever the set amount of data sectors are input. In the case where a buffer error occurs, the operation in the buffer error area set by the buffer error area setter 370 is terminated. When the terminated sequencer 390 is to be operated again, there is a need for setting the values of the target servo sector counter 310 and the skip counter 380 in order to reset the next data sector to be the data sector which was being processed at the point of the termination, as a new target data sector.

The target servo sector counter 310 maintains a value set by the microcontroller 300 before the target servo sector is reached. The target servo sector counter 310 increases its count value by "1" whenever a servo sector pulse is input, in order to continuously update information of the target servo sector, after the target servo sector is reached. When a buffer error occurs, the increased value of the target servo sector counter is maintained according to a control signal output by the buffer error area setter 370. To update the value of the skip counter 380, which is required to be reset when a buffer error occurs, the data sector counter 340 increases the skip counter value by "1" whenever a data sector pulse is input when the values of the target servo sector counter 310 and the servo sector counter 320 are the same. When the buffer error occurs, the data sector counter 340 maintains the count value in the buffer error area set by the buffer error area setter 370. Also, the data sector value of the data sector counter 340 is reset at a point when the buffer error is terminated.

When the buffer error occurs, the disk controller 118 must first find the target servo sector and then operate the skip counter 380. Accordingly, to set an appropriate buffer error area, the buffer error area setter 370 sets as the buffer error area a portion between a point when the data sector pulse is input after a buffer error occurs and a point when the servo sector pulse is input after the buffer error is terminated. When head 112 is out of the buffer error area set by the buffer error area setter 370, the second comparator 360 compares the value of the target servo sector counter 310 and the value of the servo sector counter 320, and operates the skip counter 380 when the values are the same. At a point where the skip counter 380 becomes "0," the sequencer 390 performs read/write actions from an operation after the one performed before the occurrence of the buffer error. To process a split data sector, the microcontroller 300 sends CDR (constant density recording) information, at a point where the split data sector and split occur, to the disk controller 118 (see FIG. 1), for every servo sector. When it is determined by the second comparator 360 that the values of the target servo sector counter 310 and the servo sector counter 320 are the same, the microcontroller 300 generates an interrupt signal to perform the operation so that an unnecessary load is removed from during the period from when the disk controller 118 (see FIG. 1) is turned on to when the target servo sector is searched for or during the period from when a buffer error occurs to when the target servo sector is searched for.

FIG. 4 is a timing diagram showing the operation of each portion shown in FIG. 3. First, when the value of the target servo sector is "00", when the value of the maximum servo sector is "72", when the value of the current servo sector of the servo sector counter is "71", and when the counting value of a skip counter 1 is "01", the current value of the servo sector counter 320 changes to "72" by a first servo sector pulse (1) and then is reset to "00" since the changed value is equal to the value "72" of the maximum servo sector.

The target servo sector counter 340 maintains a current set value until the value of the servo sector counter 320 becomes equal to the set value. Thereafter, the value is increased by "1" whenever a servo sector pulse is input. Also, when a buffer error occurs during the operation of a disk, the target servo counter 310 maintains its current value until the value of the servo sector counter 320 becomes equal to the current value, even though the buffer error is terminated. The servo sector counter 320 increases a counting value by "1" whenever a servo sector pulse is input, under any conditions. At this time, if the values of the servo sector counter 320 and the target servo sector counter 310 are the same, the skip counter (380) operates according to a data sector pulse so that the counting value is reduced from "01" to "00" when the first data sector pulse is input and the sequencer 390 is operated when the second data sector pulse is input (point 410 in the operation section of the sequencer).

In the meantime, when a buffer error occurs (point 420 in the actual buffer error), the target servo sector is searched for to reset the skip counter (380). Then, the value of the data sector counter 340 changes from "00" to "01" when the first data sector pulse is input, increases by one to "02" when the second data sector pulse is input, and then initialized to "00" by the next servo sector pulse. When the buffer error 420 occurs during the disk read/write actions, the current data sector counter value "02" is maintained. When the buffer error is terminated, the skip counter (380) is reset to the value "02" of the sector counter 340.

Since the disk controller passes the target servo sector position while it temporarily stops the read/write operation due to the buffer error occurring during the disk action, it waits for a rotation of the disk. Then, the disk controller compares the values of the target servo sector counter 310 and the servo sector counter 320, and if the values are the same, the disk controller operates the skip counter 380 which is reset by the second comparator 360 and turns on the sequencer 390 (sequencer operation point 430) to search for the target data sector. There is a slight delay between the time 420 when a buffer error actually occurs and the time 422 when a buffer error area is set. In the present invention, a buffer error area is set from the first data sector pulse which is input after the actual buffer error occurs to the first data sector pulse which is input after the actual buffer error is terminated. The reason why the buffer error area is set in this manner is that the data read/write must be stopped internally from the next data sector after the buffer error occurs and resumed from the servo sector at the point when the buffer error occurs.

Figure 5:
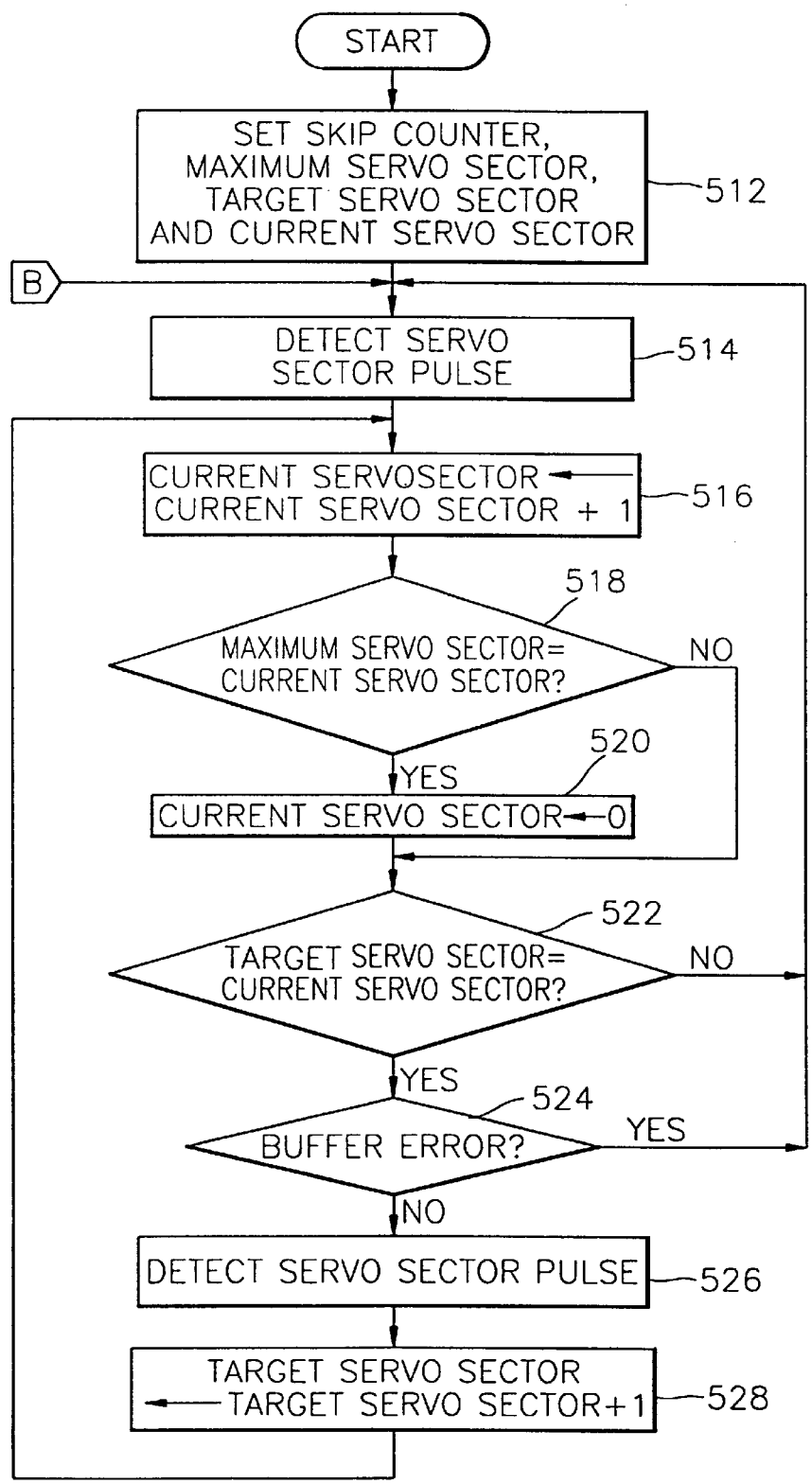
FIG. 5 is a flow chart for describing an updating process of a servo sector and a target servo sector according to the present invention.

FIG. 5 is a flow chart for describing a method for updating the current servo sector value and the target servo sector value according to the present invention.

As shown in FIG. 5, in step 512, the micro controller 300 sets a target servo sector value (number), a skip counter value, the maximum servo sector value, and the current servo sector value (number). In step 514, the micro controller 300 turns on the disk controller 118 (see FIG. 1) and detects a servo sector pulse. Here, the disk controller 118 sets an internal flag to "1" to prevent the resetting of the target data sector by the micro controller 300 when a buffer error occurs before the target data sector is reached. In step 516, when the servo sector pulse is detected, "1" is added to the current servo sector value. In step 518, the current servo sector value is compared with the maximum servo sector value. When the values of the current servo sector and the maximum servo sector are the same, which means that the upper limit on the servo sector value available in the corresponding cylinder has been exceeded, the value of the servo sector counter is reset, in step 520, to "0" which is the value of the servo sector where an index is located. In step 522, the target servo sector value is compared with the current servo sector value. If the values of the target servo sector and the current servo sector are determined to be the same, in step 522, then the target servo sector is reached. If not, then steps 514 through 522 are repeated until the values become equal.

When a buffer error occurs after the target servo sector is found, the disk controller 118 itself sets the target servo sector without any involvement of the micro controller 300. In step 524, it is determined whether a buffer error has occurred. When a buffer error is detected, in step 524, the target servo sector number maintains its value and, in step 514, a servo sector pulse is detected again. When a buffer error was not detected in step 524, a servo sector pulse is detected in step 526. In step 528, the target servo sector number is increased by "1" for the next target servo sector, and then the program returns to the current servo incrementing step 516.

Figure 6:
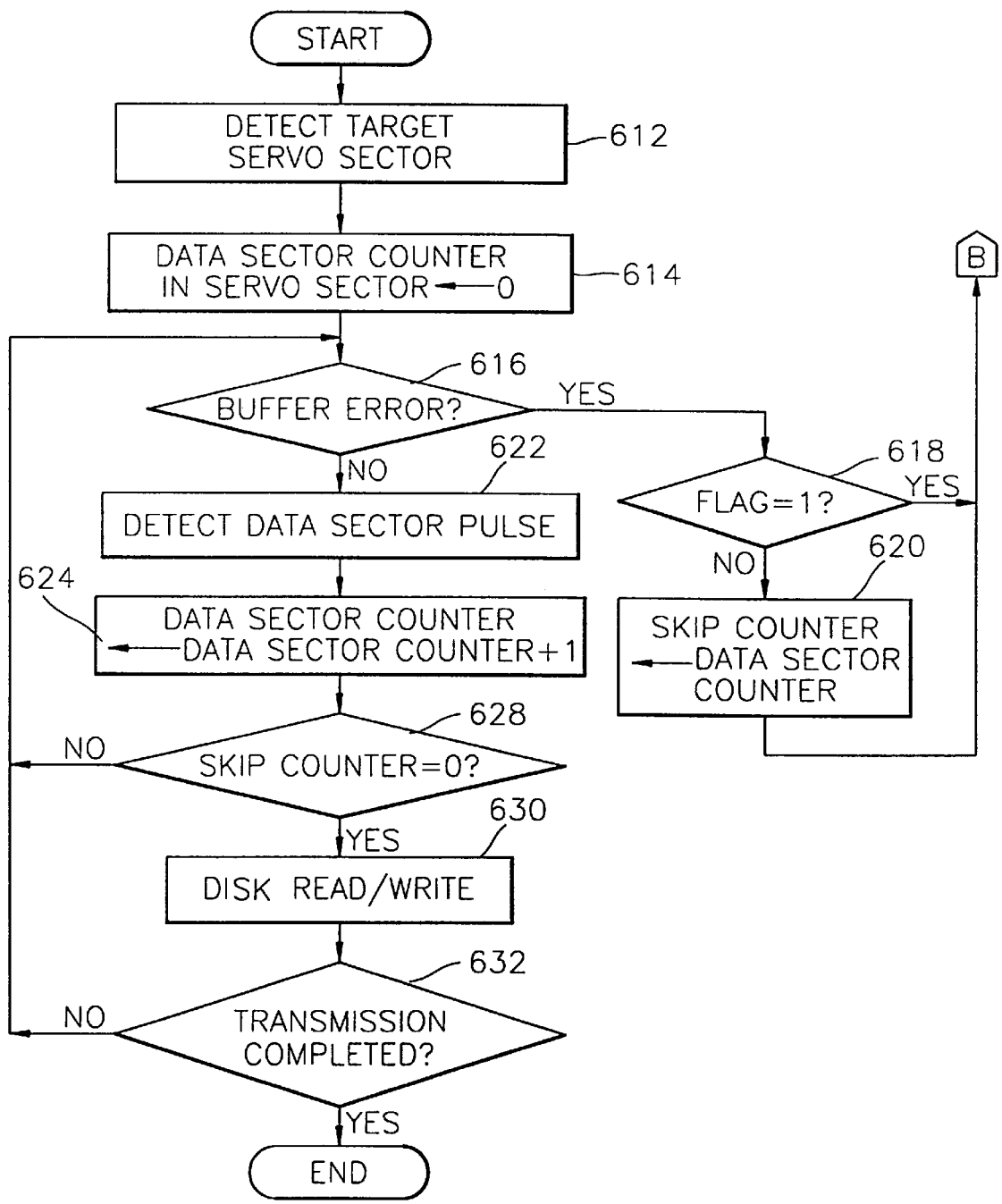
FIG. 6 is a flow chart for describing a process of the disk read/write action when the current servo sector number is the same as the target servo sector number in FIG. 5.

FIG. 6 is a flow chart for describing a method for performing disk read/write actions when the current servo sector number is determined to be equal to the target servo sector number in step 522 of FIG. 5.

In step 612, a target servo sector is detected as in step 522 of FIG. 5. In step 614, a data sector counter, for counting the data sectors in the servo sector, is initialized to "0" and an input of the data sector pulse is awaited. In step 616, it is determined whether a buffer error occurs. When the buffer error was not detected in step 616, the data sector pulse is detected in step 622. In step 624, when the data sector pulse is detected, the data sector value is increased by "1" and the value of the skip counter which stores the number of data sectors to be skipped is decreased by "1". In step 628, it is determined whether the skip counter value is "0" or not, and if not "0", the program returns to step 616. If the skip counter value was "0" in step 628, the sequencer 390 in the disk controller 118 turns on and performs the disk read/write actions to transmit the data of the data sector in step 630. In step 632, it is determined whether the sequencer 390 completed the transmission of the data sector. If yes, the program is terminated, and otherwise, the program returns to step 616.

Meanwhile, the program proceeds differently according to the internal flag, i.e., "0" or "1". The internal flag indicates whether the buffer error in step 616 occurs before or after the target data sector is searched for. Accordingly, it is determined in step 618 whether the flag is "1". When the flag is "1", i.e., the buffer error occurred before the target data sector in step 618, the skip counter value decreases whenever the data sector pulse is detected. When the buffer error occurred before the skip counter value becomes "0", the skip counter value is reset to a value set by the micro controller 300. Also, in step 620, when the buffer error occurs after step 618, in which the target data sector is searched for, the internal flag is set to "0", when the skip counter value becomes "0". Then, the skip counter is reset to the data sector counter value, being the number of the data sector in the servo sector at the point when the buffer error occurred, and the program resumes the step of searching for the target sector, from position B in FIG. 5. The flag is set to "1" when the disk controller 118 turns on, and "0" when the target data sector is reached. Further, when the buffer error occurs, the skip counter value is reset to a value set by the micro controller 300 when the flag is "1", and to the data sector counter value when the flag is "0".

As described above, according to the present invention, the disk controller stops read/write actions when a buffer error occurs in a hard disk drive. It can be recognized how far the disk read/write actions were performed when the buffer error occurred. Also, to resume the disk read/write actions, it is continuously detected whether the buffer error is terminated. When the buffer error is terminated, a setting of the target servo sector is not loaded into the micro controller, but the disk controller itself searches for the target data and performs the data read/write actions.

The present invention has been described in terms of a preferred embodiment, however, it will be appreciated that various changes and modifications may be made to the described embodiment without departing from the spirit and scope of the invention.

What is claimed is:

1. An apparatus for controlling a hard disk drive which performs disk read/write actions after reaching a target data sector, said apparatus comprising:

a first counter for counting servo sectors and outputting a target servo sector value;

a second counter for counting servo sectors and outputting a current servo sector value;

a third counter for counting a number of data sectors to be skipped when the target servo sector number output by said first counter is equal to the current servo sector number output by said second counter;

a fourth counter for counting data sectors within a servo sector and outputting a data sector value, maintaining the data sector value when a data read/write error occurs, and outputting, to said third counter, a number of data sectors to be skipped when the error is terminated; and a sequencer for controlling disk read/write actions when the number of data sectors to be skipped has been counted by said third counter.

2. The apparatus for controlling a hard disk drive as claimed in claim 1, wherein said first counter stops counting and holds the target servo sector number when a data read/write error occurs.

3. The apparatus for controlling a hard disk drive as claimed in claim 1, further comprising:
   a first storing means for storing a maximum number of servo sectors existing on a disk cylinder; and
   a first comparator for comparing the target servo sector value output by said first counter with the maximum number of servo sectors stored in said first storing means and initializing the counter value of said first counter when the current servo sector value output by said first counter is equal to the maximum number of servo sectors stored in said first storing means.

4. The apparatus for controlling a hard disk drive as claimed in claim 1, wherein, when a data reading and storing error occurs, the value of said fourth counter is reset, at a point when the error is terminated, to the value of said third counter, so that the target data sector is reached.

5. A method for controlling a hard disk drive which performs disk read/write actions after reaching a target data sector, said method comprising the steps of:
   (a) calculating a current servo sector number whenever a servo sector pulse is input;
   (b) determining whether a data read/write error exists when a target servo sector value is the same as the current servo sector value calculated in said step (a);
   (c) detecting a servo sector pulse and updating the target servo sector value when there is no error in said step (b), and maintaining the target servo sector value when there is an error in said step (b); and
   (d) detecting a data read/write error when the target servo sector value is maintained in said step (c), setting the data sector value in the servo sector maintained in said step (c) as a number of data sector units to be skipped, and performing disk read/write actions from a data sector next to the one accessed previously.

6. The method for controlling a hard disk drive as claimed in claim 5, further comprising a step of detecting a data sector pulse and updating a data sector value when there is no error in said step (d), setting the updated data sector value as the number of data sector units to be skipped, and performing disk read/write actions.

7. The method for controlling a hard disk drive as claimed in claim 5, further comprising a step of resetting the current servo sector value when the current servo sector value is equal to the maximum servo sector number on a cylinder.

8. The method for controlling a hard disk drive as claimed in claim 5, wherein a data sector number in the target servo sector is initialized after the target servo sector value is reached.

* * * * *